United States Patent [19]

Cohn et al.

[11] Patent Number: 4,611,718

[45] Date of Patent: Sep. 16, 1986

[54] DEVICE FOR STORING A PLURALITY OF DISHES OR THE LIKE IN A PLURALITY OF STACKS

[75] Inventors: Robert J. Cohn, Dallas; Michael J. Sudimak, Shavertown, both of Pa.

[73] Assignee: Intermetro Industries Corporation, Wilkes-Barre, Pa.

[21] Appl. No.: 650,244

[22] Filed: Sep. 13, 1984

[51] Int. Cl.$^4$ .............................................. A47F 7/00
[52] U.S. Cl. ................................... 211/49.1; 211/184
[58] Field of Search ................... 211/49.1, 59.3, 59.4, 211/133, 189, 175, 59.2, 184; 280/79.1 A, 79.1 R; 312/45

[56] References Cited

U.S. PATENT DOCUMENTS

| | | | |
|---|---|---|---|
| 943,719 | 12/1909 | Vick | 211/184 X |
| 2,454,858 | 11/1948 | Burt | 211/49.1 |
| 2,670,853 | 3/1954 | Schneider | 211/49.1 |
| 2,972,421 | 2/1961 | Frick | 211/184 |
| 3,661,268 | 5/1972 | Boley | 211/49.1 |
| 4,354,605 | 10/1982 | Brutsman | 211/59.3 |

Primary Examiner—Ramon S. Britts
Assistant Examiner—Sarah A. Lechok Eley
Attorney, Agent, or Firm—Fitzpatrick, Cella, Harper & Scinto

[57] ABSTRACT

A device stores a plurality of dishes or the like in a plurality of stacks with each stack at an object region within the device. The device includes a generally square base and corner-defining structures that project generally perpendicularly from the base to define the corners of each of four quadrant regions. Divider panels are removably mountable on the base to separate the quadrant regions. Further, partitions are mounted in each of the quadrant regions for selectable movement among first, second, and third fixed positions. All of the partitions, when in the first fixed positions and with the divider panels mounted, cooperate with the corner-defining structures and the divider panels to define four generally equally sized primary object regions. The partitions, when in the second fixed positions with the divider panels demounted, cooperate with the corner-defining structures to define eight generally equally sized secondary object regions. Finally, the partitions, when in the third fixed positions and with the divider panels mounted, cooperate with the corner-defining structures and the divider panels to define twelve generally equally sized tertiary object regions.

27 Claims, 11 Drawing Figures

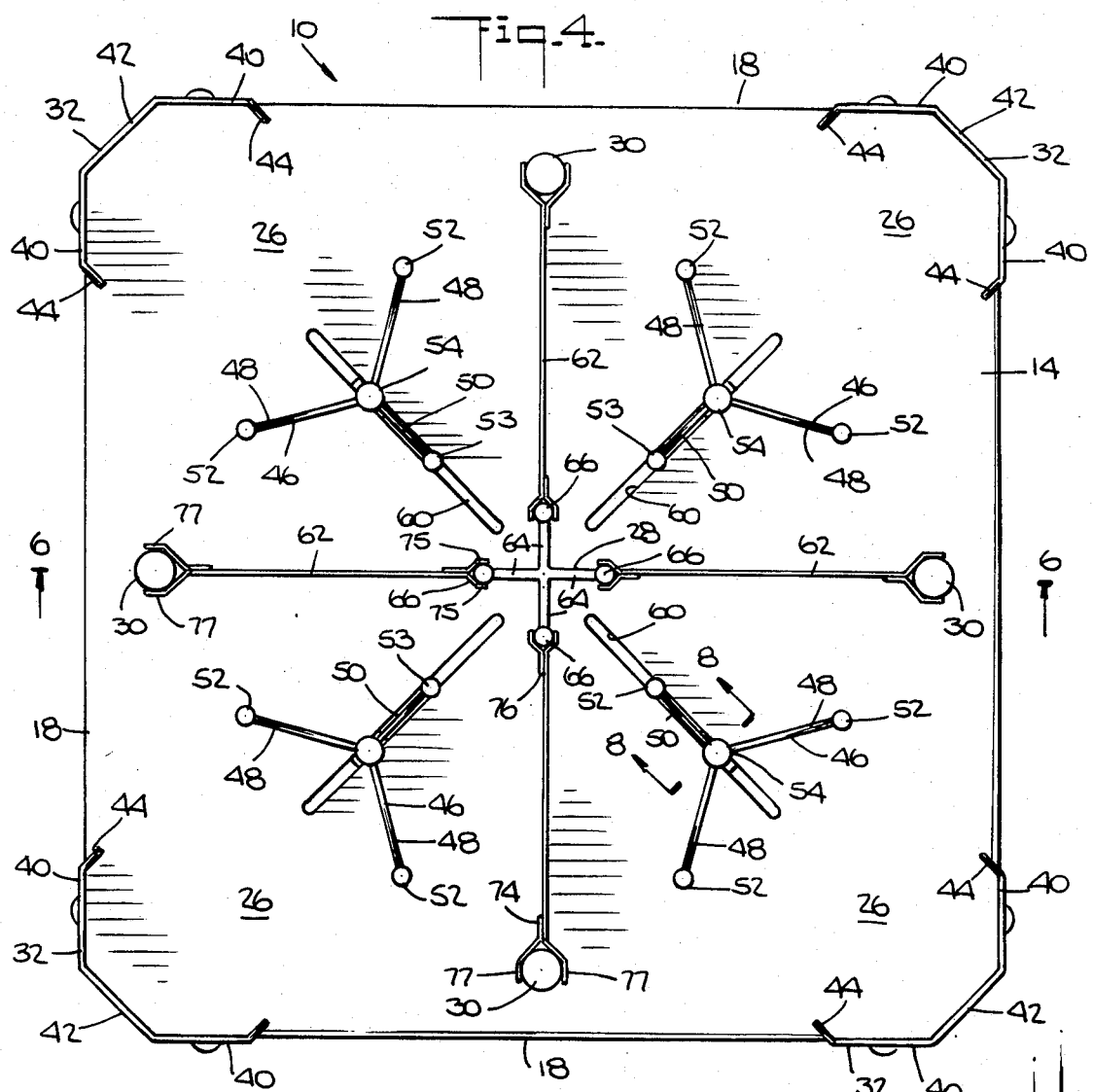
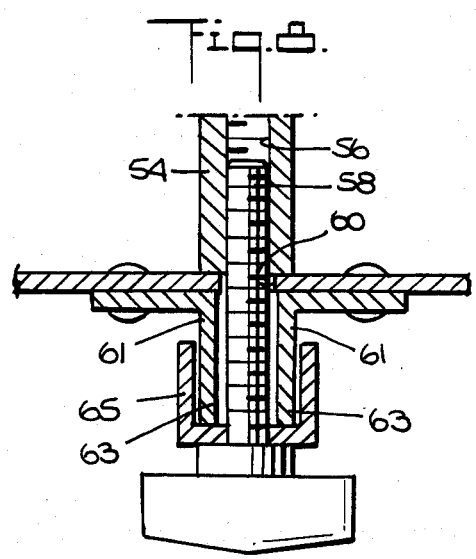
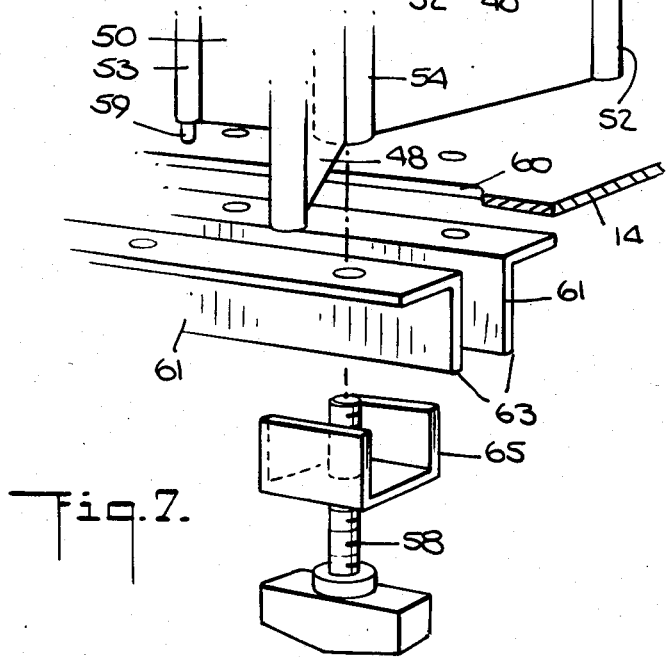

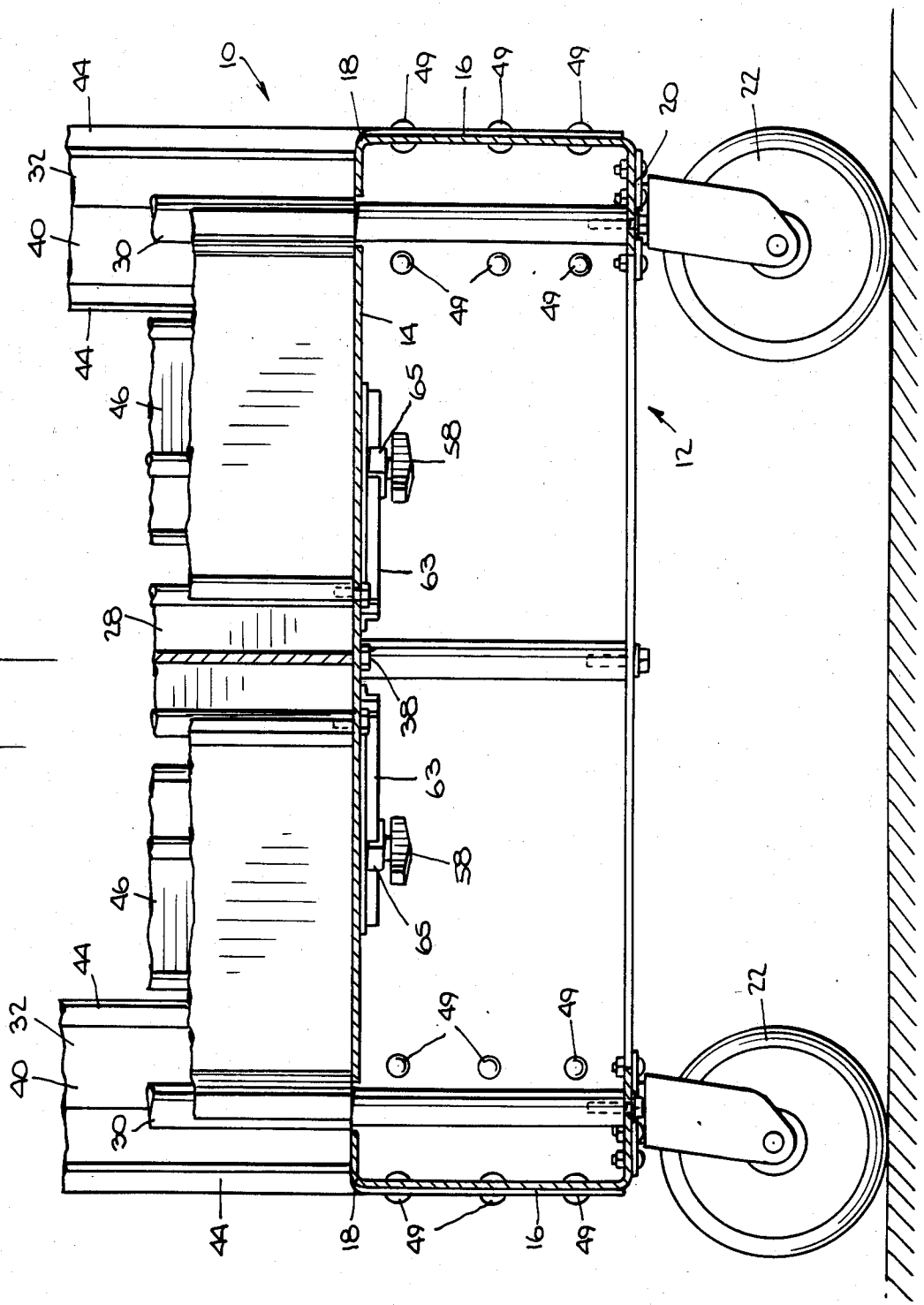

DEVICE FOR STORING A PLURALITY OF DISHES OR THE LIKE IN A PLURALITY OF STACKS

BACKGROUND OF THE INVENTION

1. Field of the Invention

The present invention relates to a device for storing a plurality of dishes or the like in a plurality of stacks. This device has particular utility as a dish dolly or cart for storing and transporting dishes of various sizes in institutions, such as hospitals or restaurants. Of course, this device may be utilized to store and transport other dish or saucer-shaped objects which are stackable in "poker-chip" fashion.

2. Description of the Prior Art

Devices are now known for storing and transporting objects such as dishes. For example, InterMetro Industries Corporation, the assignee of the subject invention, makes and sells various types of such devices. In each of one of a series of such devices, called the "Metro Mobile Dish Dollies, Poker-Chip Series", which can be either open or heated, a chassis is mounted on four casters for free rolling movement. The chasis defines a horizontal base. A number of dividers or separators are fixed with and project vertically from the base to form a fixed plurality of vertically extending column-like regions in which stacks of dishes can be confined. Models identified by numbers T1AN, T1BN, T2AN, T2BN, T3N, T4N and T5N in this series may be designed to store, for example, four, eight, or other fixed numbers of stacks of dishes.

A Model No. T16 dish dolly made be InterMetro Industries also includes a chassis mounted on casters, and a center post and four side posts projecting respectively from the center of the base defined by the chassis and from the centers of each of the edges of the base. Separators are fixed to the based and are secured to and join the center post and each of the side posts. Corner posts also project vertically from the chassis at each of its corners. Thus, four quadrant regions are defined by the posts and separators. Additionally, Y-shaped partitions are removably mountable in each of the quadrant regions to divide it into three secondary regions. Each Y-shaped partition is adjustable between the center post and one corner post to alter the size of the three secondary regions.

While the Model No. T16 dish dolly provides additional flexibility, when compared with dish dollies that do not incorporate such adjustable partitions, by accommodating varying numbers of stacks of dishes, this flexibility can still be improved further. In particular, the Model T16 dish dolly has somewhat limited ability to accommodate different numbers of stacks of equally sized dishes. As shown in FIG. 1 of the accompanying drawing, which schematically illustrates one configuration of the Model No. T16 dish dolly with the Y-shaped partitions removed, a stack 110 of equally sized large dishes can be supported and stored respectively in each of four quadrant regions 112 defined by the fixed separators 114 and corner posts 116. With all of the Y-shaped partitions 118 in place, and positioned centrally in each of the quadrant regions 112 in which it is mounted, the Model No. T16 dish dolly can accommodate twelve stacks 120 of equally sized but smaller dishes, as shown in FIG. 2. However, there may be applications in which it is desirable to store other numbers of stacks of equally sized dishes.

Other dish dollies, which suffer from the same apparent disadvantages described above are also offered by Crescent Metal Products and Precision Metal Products, Inc.

SUMMARY OF THE INVENTION

Accordingly, it is an object of the present invention to provide a device for storing a plurality of dishes or similar objects in a plurality of stacks that overcomes the apparent disadvantages in known prior art devices described above.

It is more particularly an object of the present invention to provide a device for storing a plurality of dishes or the like of equal size in several different numbers of stacks. Specifically, the device of the present invention is capable of storing equally sized dishes or the like in either four, eight, or twelve stacks.

It is an additional object of the present invention to provide a device for storing dishes or the like that, with a limited number of models of different size, can nevertheless store stacks of dish-like objects of the same size at higher density than known devices.

It is still a further object of the present invention to provide a device for storing dishes or the like that retains all of the advantages of known devices including their durability, mobility, and ease of use.

In accordance with a preferred embodiment the device of the present invention for storing a plurality of dishes or similar objects includes a generally square base and a plurality of corner-defining posts projecting generally perpendicularly from the base and defining the corners of each of four quadrant regions. Dividers are removably mountable on the base to separate the quadrant regions. Partitions are further mounted in each of the quadrant regions for selective movement among first, second, and third fixed positions. All of the partitions, when in the first fixed positions with the dividers mounted on the base, cooperate with the corner-defining posts and the dividers to define four generally equally sized primary object regions. The partitions, when in the second fixed positions with the dividers demounted, cooperate with the corner-defining posts to define eight generally equally sized secondary object regions. When in the third fixed positions with the dividers mounted on the base, the partitions cooperate with the corner-defining posts and the dividers to define twelve generally equally sized tertiary object regions.

Therefore, depending upon the positions of the partitions and the mounted or demounted condition of the dividers, the device of the present invention may store any of four, eight, or twelve stacks of equally sized dishes or similar objects. This flexibility is significant because there is a large range of dish sizes that can be efficiently carried in eight stacks whereas in prior art devices, only four stacks of dishes of such sizes can be carried. (The object regions of such prior art devices, if configured to hold twelve stacks, would be too small to accommodate objects that might otherwise be stored in eight stacks.) Additionally, dishes of a wide range of sizes generally can be stored at higher density in the device of the present invention than they can be in known devices.

Furthermore, fewer different sizes of the device of the present invention may be offered that, nevertheless, accommodate a wider range of dish sizes for storage at high density. By offering fewer numbers of models that provide such flexibility, advantages in production, inventory, warehousing, distribution, and customer service are also achieved.

Thus, the device of the present invention provides a simple and elegant, yet significant improvement over known dish dolly devices.

These and other objects of the present invention will be pointed out in or will be understood from the following detailed description provided below in conjunction with the accompanying drawing.

BRIEF DESCRIPTION OF THE DRAWING

FIG. 3 is a perspective view of device in accordance with the preferred embodiment of the present invention, for storing objects such as dishes and the like.

FIG. 4 is a top plan view showing the configurations of the various corner-defining posts of the device in accordance with the preferred embodiment of the present invention.

FIG. 6 is a partial vertical cross-sectional view taken on plane 6—6 in FIG. 4 showing the structure of the chassis of the device of the preferred embodiment of the present invention and details of the arrangement for securing the movable partitions to the chassis.

FIG. 7 is an enlarged perspective view, partly in cross-section, showing further details of the arrangement for securing the movable partitions to the chassis.

FIG. 8 is a vertical cross-sectional view taken on plane 8—8 in FIG. 4.

DETAILED DESCRIPTION OF THE PREFERRED EMBODIMENT

Figure 1:
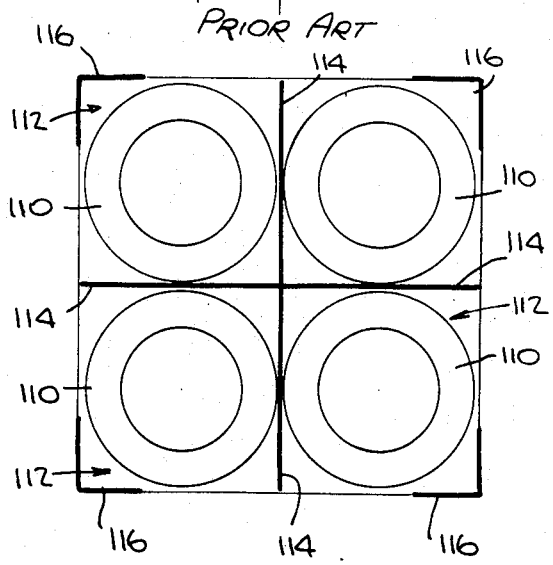
FIG. 1 is a schematic diagram of a conventional device for storing oblects such as dishes or the like configured to receive stacks of objects of equal size.
Figure 2:
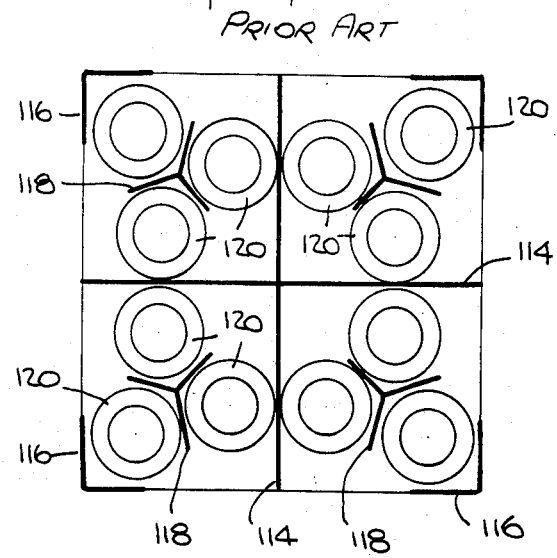
FIG. 2 is a schematic diagram similar to that shown in FIG. 1 of a conventional device configured to store twelve stacks of objects of equal size.
Figure 9:
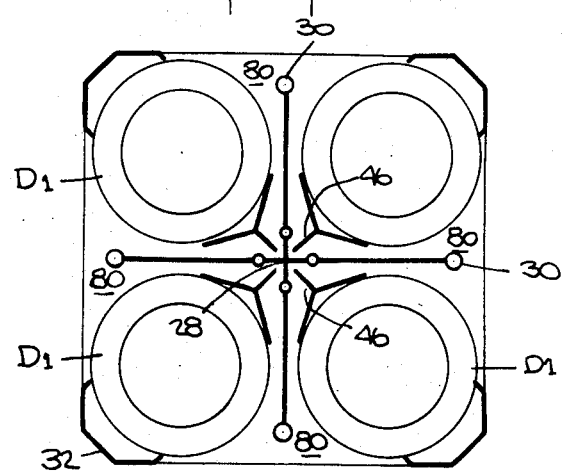
FIG. 9 is a schematic diagram of the arrangement of four dish stacks held on the device in accordance with the preferred embodiment of the invention with the center partitions located in a first position and the dividers mounted between the side posts and center post.
Figure 10:
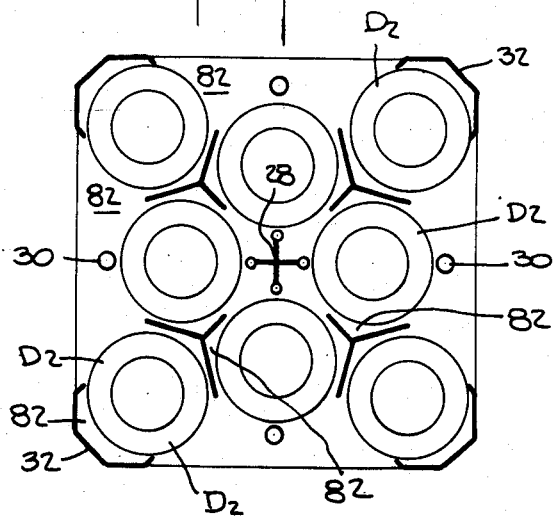
FIG. 10 is a schematic diagram of the arrangement of eight dish stacks held in the device of the preferred embodiment of the present invention with the partitions fixed in their second positions and with the dividers removed from between the side posts and the center post.
Figure 11:
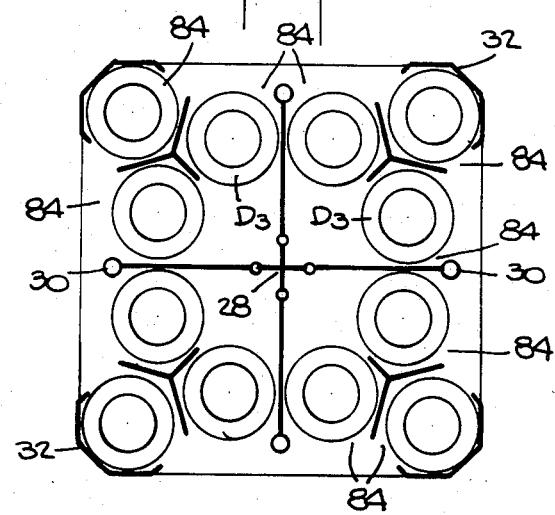
FIG. 11 is a schematic diagram of the arrangement of twelve dish stacks held in the device in accordance with the preferred embodiment of the present invention with the partitions mounted in their third positions and with the dividers again mounted between the side posts and center post.

The preferred embodiment of the present invention is illustrated in detail in FIGS. 3 through 8 and is specifically designed to accommodare either four, eight, or twelve stacks of objects, such as dishes or the like, which are of equal size, in manners shown respectively in FIGS. 9, 10, and 11. This device has particular utility for storing dishes in hospitals, restaurants, and other institutions, but may be used with equal advantage to store other dish or saucer-like objects that may be round, oval or any of a large number of other shapes. For convenience, however, the preferred embodiment of the present invention will be described with reference to storage of dishes, which are illustrated as round in plan view.

Figure 3:
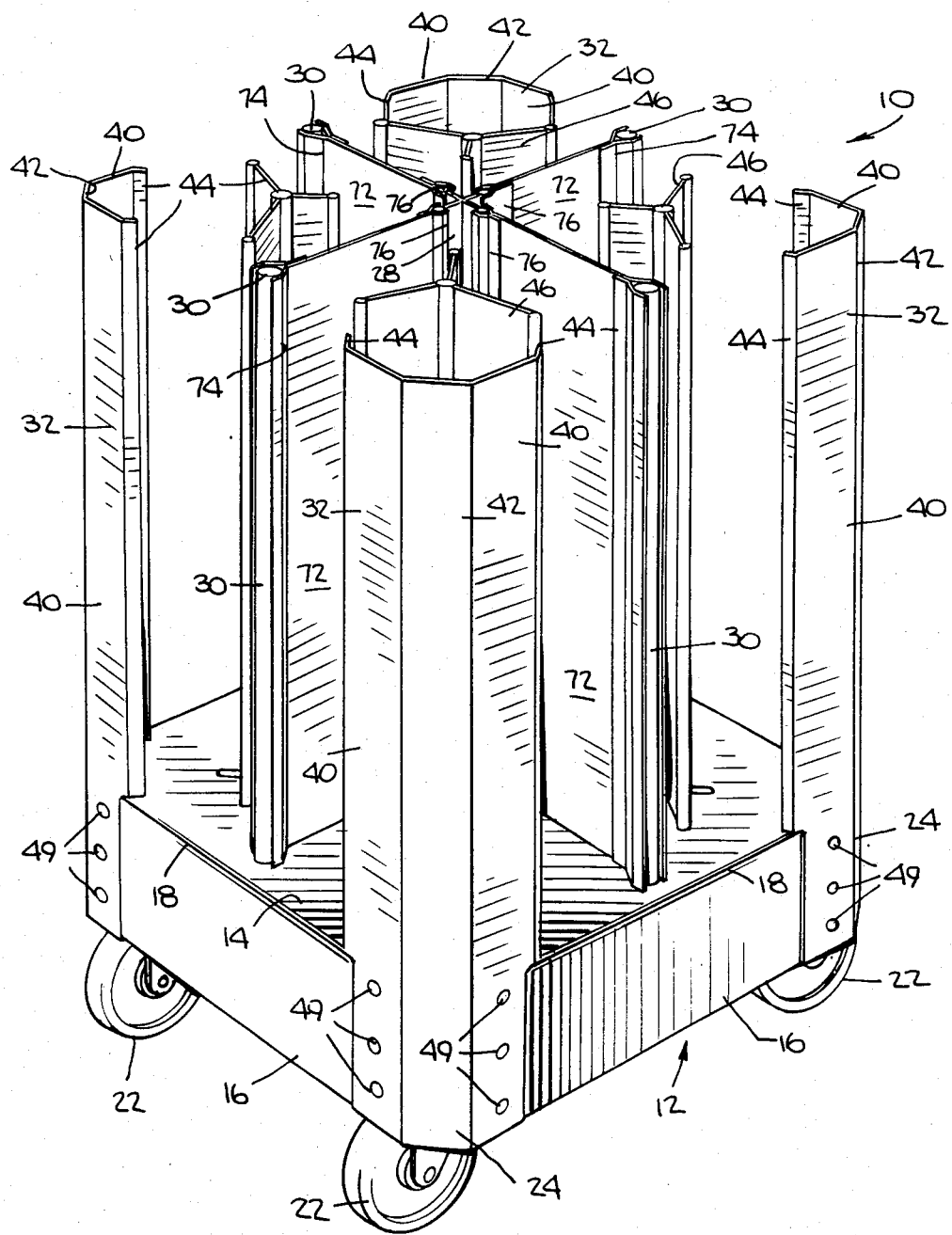

Referring now specifically to FIG. 3, the device of the present invention is generally indicated at 10 and includes a chassis generally indicated at 12 which defines a square, flat, horizontally extending base 14. The chassis may be formed of any suitable material such as sheet metal and is desirably formed of 0.100 thick aluminum. As shown in greater detail in FIG. 6, the chassis includes four side walls 16, each of which depends from one edge 18 of the base and each of which terminates in an inwardly directed flange 20 that extends generally parallel to the base. Four casters 22 of conventional construction are secured to the flanges 20 in the region of the corners 24 of the chassis to permit rolling movement so that the device of the invention to be easily maneuvered.

A number of corner-defining structures are mounted on the base 14 and project vertically upwardly therefrom to define four vertically extending quadrant regions 26 shown, for example, in FIG. 4. These corner-defining structures include a center post 28, four side posts 30, each secured to the base in the vicinity of the center of one edge 18, and four corner boundary posts or wall-like elements 32. The center post 28 and each of the side posts 30 are formed with a threaded bores (not show) at their lower ends that receive bolts 38 (such as is shown in FIG. 6) passed upwardly from the bottom of the base 14 to secure the posts thereto. As can be seen in FIGS. 3 and 4, the corner boundary posts are generally C-shaped in horizontal cross-section and comprise side walls 40 that lie against adjacent side walls 16 of the chassis, a back wall 42 that lies against a truncated portion of each corner 24 of the chassis, and two narrow lips 44 that extend over the base of the chassis toward the center post 28. Rivets 49 or other suitable means are used to secure the abutting side walls of the chassis and the side walls of the corner posts together.

Figure 5:
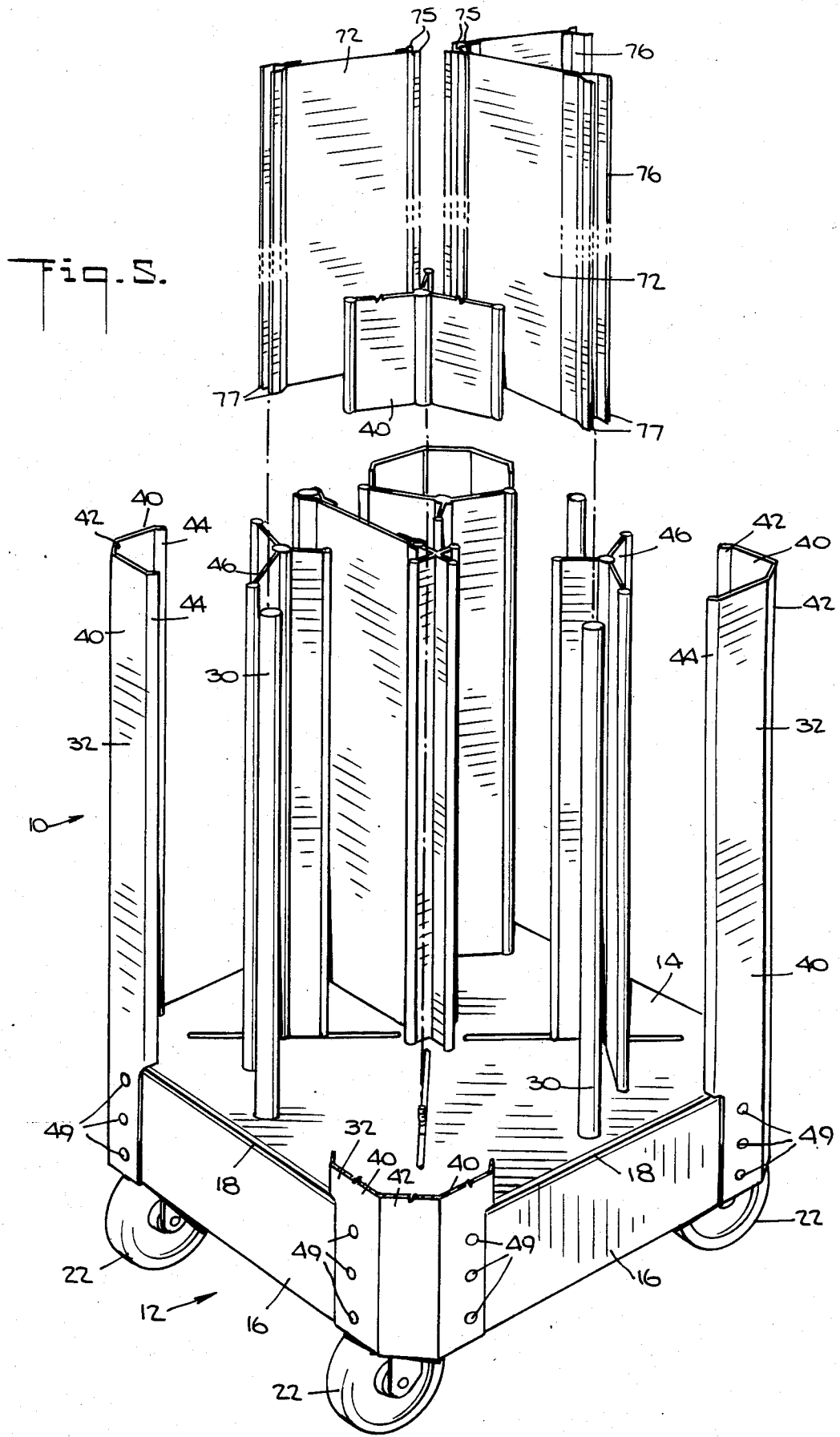
FIG. 5 is an exploded perspective view, party broken away to show detail, of the device of the invention.

As can be seen in FIGS. 3 and 5, each of the center posts, side posts and corner boundary posts project a substantial distance above the base in order to together define the corners of the quadrant regions 26 in which stacks of dishes may be placed as described in greater detail below.

The device of the present invention further includes four partitions 46, each of which is removably mounted with the chassis 12 in one quadrant region 26. These partitions are generally Y-shaped in top plan view as shown in FIG. 4, comprising three partition walls. Two of the partition walls 48 are wider than the third 50. Each partition wall 48 terminates in an elongated bead 52 that generally opposes one lip 44 of one corner post. The walls 48 may be formed of a single piece of sheet metal bent at a vertex 54 to form an angle of about 120°. The third wall 50 may be secured at the vertex 54 by, for example, welding to form an angle of about 120° with each of the walls 48. This wall 50 is also formed with a bead 53. Alternatively, the partition structure may be formed as an extrusion of, for example, aluminum.

As shown in FIGS. 7 and 8, the bottom of each vertex 54 of each partition wall is provided with a threaded bore 56 that receives a suitable threaded fastener 58 passing upwardly through the base 14 of the chassis 12 to secure the partitions to the base. The threaded bore 56 can be provided by tapping and/or by fitting the material with threaded insert. More particularly, as can be seen in FIG. 4, the base is formed with four elongated slots 60, each extending in one quadrant region between one corner boundary post 32 and the center post 28. The bead 53 has a diameter larger than the width of the slot 60 and a pin 59 (FIG. 7) depends from the bead 53 and is received in the slot 60. In this way the wall 50 is prevented from being drawn into the slot and the entire partition 46 is prevented from turning when the threaded fastener 58 is tightened. Angles 61 are mounted on the underside of the chassis and each has a lip 63 depending from one edge of each slot to define a channel. A clamp 65 embraces the opposing lips of two angles mounted on opposite edges of each slot and is urged against the lips by the threaded fastener 58, which may be in the form of a thumb screw, tapped into a threaded bore at the bottom of the vertex of each partition 56. Accordingly, the partitions 46 may be mounted at any of an infinite number of positions along the extent of the slots 60 to variably divide each quadrant region in a different manner, as will be described in greater detail below. Further, the partitions may be removed from each quadrant region merely by removing the fasteners 58 and lifting the partitions from the chassis.

The device of the present invention further incorporates novel structure for greatly enhancing its flexibility by permitting storage of any of four, eight, or twelve stacks of equally sized dishes. This novel structure includes four divider panels 62, each of which is removably mountable between the center post 28 and one side post 30. As specifically shown in detail in FIGS. 4 and 5, the center post is formed with a cross-shape (+-shape) in top plan view including four legs 64, each of which terminates in a vertically extending bead 66. The center post may be formed from individual welded members or may be extruded, for example, of aluminum.

Each divider panel 62 includes a central panel section 72 (FIGS. 3 and 5) having elongated vertically extending and opposing edges 74 and 76. Each divider panel may be formed from sheet metal, such as aluminum, and is stamped or otherwise provided at its inner edge 76 with opposing tabs 75 that extend sidewardly from the plane of the central panel section 72 to opposite sides of that plane. Similarly, the outer edge 74 of each divider panel 62, is also formed or otherwise provided with a opposing of tabs 77 that extend to opposite sides of the plane of the central panel section 72. The tabs may be stamped from the central panel section 72, may be formed with one of each pair bent from the central panel section and with the other made as separate piece secured to the central panel section, or may be formed in any other suitable way.

As can be seen in FIGS. 4 and 5, the sidewardly projecting tabs 75 are spaced to embrace one bead 66 formed at the extreme of a leg 64 of the center post 28. The sidewardly extending tabs 77 are spaced to embrace one side post 30. As will be apparent, particularly with reference to FIG. 5, each divider panel may be removed from its mounted position by being slid in the direction of the axes of the center and side posts. Similarly, the divider panels may be mounted by being slid axially onto the center and side posts with the respective tabs 75 and 77 embracing the posts as described above.

By providing removable divider panels, the flexibility of device of the present invention is greatly enhanced. As shown in FIG. 9, with the partitions 46 in first fixed positions close to the center post 28, or with the partitions removed from their mounted position, and with the divider panels 62 in their mounted positions, the device of the invention can store four stacks D1 of dishes, all of equal size, with each stack in one of four primary object regions 80.

With the partitions 46 moved to second fixed positions and with the divider panels 62 removed from the device, eight stacks D2 of dishes, all of equal size, may be stored as shown in FIG. 10, with each stack at one of eight secondary object regions 82.

Finally, with the partitions 46 in third fixed positions and with the divider panels 62 replaced in the device, twelve stacks D3 of dishes, all of equal size, may be stored with each stack at one of twelve tertiary object regions 84.

It has been found that by providing two different model sizes of the device of the present invention, namely one having a base measuring 19 inches square and the other having a base measuring 23 inches square, in nearly all cases dishes having diameters from 4 inches to 11 inches may be accommodated at higher density than other previously available adjustable dish dollies. Therefore, the present invention provides a convenient and efficient means for storing dishes of equal sizes in stacks and also provides manufacturing efficiency since only two different model sizes are required to accommodate standard sized dishes. Thus, the present invention provides significant advantages over known devices from many points of view.

Accordingly, although a preferred embodiment of the present invention has been described above in detail, it is to be understood that this description is for purposes of illustration. Modification may be made to the described device for storing objects, such as dishes or the like, in a plurality of stacks in order to adapt it to particular applications.

What is claimed is:

1. A device for storing a plurality of objects such as dishes or the like in a plurality of stacks each at an object region therein, said device comprising:
   generally square base means;
   corner-defining means projecting generally perpendicularly from said base means and defining the corners of each of four quadrant regions;
   divider means removably mountable on said base means for separating said quadrant regions when mounted; and
   partition means mounted in each of said quadrant regions for selectable movement among first, second, and third fixed positions; all of said partition means, when in said first fixed positions with said divider means mounted, cooperating with said corner-defining means and said divider means to define four generally equally sized primary object regions; when in said second fixed positions with said divider means demounted, cooperating with said corner-defining means to define eight generally equally sized secondary object regions; and when in said third fixed positions with said divider means mounted, cooperating with said corner-defining means and said divider means to define twelve generally equally sized tertiary object regions.

2. A device as claimed in claim 1, wherein said base means comprises a chassis defining a generally horizontal generally square base for supporting stacks of objects.

3. A device as claimed in claim 2, further comprising caster means secured to said chassis for supporting said device for rolling movement.

4. A device as claimed in claim 1, wherein said base means has four edges and wherein said corner-defining means comprises a center post projecting generally perpendicularly from approximately the center of said base means and one side post projecting generally perpendicularly from the vicinity of the center of each of said edges of said base means.

5. A device as claimed in claim 4, wherein said divider means comprises four divider panels each configured to be removably mounted between said center post and one said side post.

6. A device as claimed in claim 5, wherein said center post has four legs defining a cross-shaped cross section, and wherein each said divider panel includes means for engaging one leg of said center post and one said side post.

7. A device as claimed in claim 6, wherein said engaging means is configured to permit each divider panel to be mounted with said center post and one said side post by being slid axially relative thereto.

8. A device as claimed in claim 7, wherein each said divider panel includes opposing lateral edges and wherein said engaging means comprises tab means formed on each of said lateral edges for embracing one leg of said center post and one said side post.

9. A device as claimed in claim 1, wherein said divider means comprises means for engaging said corner-defining means by sliding movement generally perpendicular to said base means.

10. A device as claimed in claim 1, wherein said corner-defining means comprises wall means projecting from adjacent edges of said base means in the vicinity of each corner thereof.

11. A device as claimed in claim 1, wherein each said partition means comprises three partition walls secured together at a common vertex and each making an angle of about 120° with the others thereof.

12. A device as claimed in claim 1, wherein one of said corner-defining means projects from each corner of said base means, wherein at least one of said corner-defining means projects from the center of said base means, and wherein said device further comprises means for mounting each said partition means with said base means in one said quadrant region for movement among said first, second, and third fixed positions between one said corner-defining means projecting from a corner of said base means and said one corner-defining means projecting from the center of said base means.

13. A device as claimed in claim 12, wherein each said partition mounting means also is constructed to selectably secure said partition means associated therewith in any one of said first, second, and third fixed positions.

14. A device as claimed in claim 1, wherein each said partition means comprises three partition walls secured together at a common vertex and each making an angle of about 120° with the others thereof, one of said partition walls extending in the direction between one said corner-defining means projecting from one of said corners of said base means and said one of said corner-defining means projecting from the center of said base means.

15. A device as claimed in claim 1, further comprising means for mounting each said partition means with said base means for selectable movement to an infinite number of positions between said first and third fixed positions and for securing said partition means at any one of the infinite number of positions.

16. A device as claimed in claim 1, wherein in said first positions said partition means are removed from said quadrant regions.

17. A device for supporting a plurality of objects such as dishes or the like in a plurality of stacks, each at an object region therein, said device comprising:
chassis means defining a generally square horizontal base;
center post means projecting vertically upwardly from the center of said base;
corner boundary means projecting vertically upwardly from each of the corners of said base;
side post means projecting vertically upwardly from said base intermediate two adjacent corner boundary means; said center post means, said corner boundary means, and said side post means together defining the corners of four quadrant regions extending vertically above said base;
four generally Y-shaped partitions each mounted on said base in one said quadrant region for selectable movement among first, second, and third fixed positions between said center post means and one said corner boundary means; and
divider means removably mountable between said center post means and each said side post means for separating said quadrant regions;
all of said partitions when in said first fixed positions with said divider means mounted, cooperating with said corner boundary means, said center post means, said side post means, and said divider means to define four generally equally sized primary object regions; when in said second fixed positions with said divider means demounted, cooperating with said corner boundary means, said center post means, and said side post means to define eight generally equally sized secondary object regions; and when in said third fixed positions with said divider means mounted, cooperating with said corner boundary means, said center post means, said side post means, and said divider means to define twelve generally equally sized tertiary regions.

18. A device as claimed in claim 17, further comprising caster means secured to said chassis for supporting said device for rolling movement.

19. A device as claimed in claim 17, wherein said divider means comprises four divider panels each configured to be removably mounted between one said side post and said center post.

20. A device as claimed in claim 19, wherein said center post has four legs defining a cross-shaped cross-section and wherein each said divider panel includes means for engaging one leg of said center post and one said side post.

21. A device as claimed in claim 20, wherein said engaging mean is configured to permit mounting of each divider panel with said center post and one said side post by being slid axially relative thereto.

22. A device as claimed in claim 21, wherein each said divider panel includes opposing lateral side edges and wherein said engaging means comprises tab means formed on each of said lateral side edges for embracing one leg of said center post and one said side post.

23. A device as claimed in claim 17, wherein each said corner boundary means comprises wall means projecting from adjacent edges of said base in the vicinity of each corner thereof.

24. A device as claimed in claim 17, wherein each said Y-shaped partition comprises three partition walls secured together at a common vertex and each making an angle of about 120° with others thereof.

25. A device as claimed in claim 24, wherein one of said partition walls on each said Y-shaped partition extends in the direction between one said corner boundary means and said center post means.

26. A device as claimed in claim 17, further comprising means mounting each said Y-shaped partition with said base means in one quadrant region for movement among said first, second, and third fixed positions and for securing each said partition at said positions and at an infinite number portions between said first and third positions.

27. A device as claimed in claim 17, wherein in said first position said partitions are removed from said base.

* * * * *